United States Patent [19]

Hanson

[11] Patent Number: 4,514,928

[45] Date of Patent: May 7, 1985

[54] LEADER HOLDER WITH ELASTIC ELEMENT

[75] Inventor: Clarence A. Hanson, Hilman, Minn.

[73] Assignee: Richard A. Hanson, Woodinville, Wash.

[21] Appl. No.: 461,660

[22] Filed: Jan. 27, 1983

[51] Int. Cl.³ .............................................. A01K 97/06
[52] U.S. Cl. ................................................... 43/57.2
[58] Field of Search ................................ 43/57.2, 57.1

[56] References Cited

U.S. PATENT DOCUMENTS

| | | | |
|---|---|---|---|
| 2,595,463 | 5/1952 | Kamps | 93/57.5 |
| 2,596,896 | 5/1952 | Goad | 43/57.2 |
| 2,601,736 | 7/1952 | Fisher | 43/43.11 |
| 2,730,833 | 1/1956 | Newell | 43/57.2 |
| 2,749,654 | 6/1956 | Harris | 43/57.2 |
| 2,789,389 | 4/1957 | Moen | 43/57.2 |
| 2,791,863 | 5/1957 | Sweeney | 43/57.2 |
| 2,826,856 | 3/1958 | Marion | 43/57.2 |
| 3,122,855 | 3/1964 | Collier | 43/57.2 |
| 3,397,480 | 8/1968 | Bengtsson | 43/54.1 |
| 3,564,755 | 2/1971 | Lindgren | 43/57.2 |
| 3,785,080 | 1/1974 | Wallace | 43/54.1 |
| 3,890,737 | 6/1975 | Jones | 43/57.2 |
| 3,991,507 | 11/1976 | Bart | 43/54.1 |
| 4,006,554 | 2/1977 | Tice | 43/57.2 |
| 4,036,451 | 7/1977 | Pipkin | 242/137.1 |

Primary Examiner—Gene P. Crosby
Attorney, Agent, or Firm—Gregory W. Moravan

[57] ABSTRACT

A fishing leader storage device having deep, generally opposed pairs of winding slots located on opposite sides of the device to receive the leader; and having an elastic spanning element located within and across the winding slots to provide tension to hold taut the leader which is wound on the device over the spanning element within the winding slots. The winding slots act to both pilot the leader wound on the device, and are deep enough to leave clearance for deflection of the spanning element under the tension exerted by the leader wound on the device. Between adjacent slots are located posts which may accept a loop on the end of the leader. The free end of the leader may be held under one of a plurality of elastic retaining elements extending between opposing pairs of winding slots and running parallel to the winding direction of the leader. The winding plan surfaces of the device may be made convex to improve the holding power of the elastic retaining elements. Additionally, lateral anchor slots extending at an angle with respect to the winding direction may be provided, each containing an elastic anchor element, to provide variable anchor points for the hook which is typically carried by one end of the leader.

11 Claims, 4 Drawing Figures

LEADER HOLDER WITH ELASTIC ELEMENT

BACKGROUND OF THE INVENTION

The present invention relates to a storage device for fishing leaders which maintains tension on the leaders during a simple winding of the leaders into winding slots provided by the device.

SUMMARY OF THE INVENTION

There has been a continuing need for a device to store leaders in a secure manner, wherein the device will allow to be wound on it leaders of any length while allowing the user to remove a leader of known length. The present invention fills both these needs.

A further object of the invention is to allow winding on the device leaders which contain elements in addition to hooks such as swivels, beads, spinners, weights and the like.

The present invention fulfulls all these objectives by providing a device in which the leader is wound in deep winding slots located in opposing sides of the base of the device, and by providing an elastic spanning element which spans the winding slots somewhat below their top, outside ends. By locating the elastic spanning element below the tops of the winding slots, the elastic spanning element does not interfere with the ability of the winding slots to provide a piloting function for winding the leader. By using deep winding slots, there is space left below the elastic spanning element for its deflection, which increases as it supports additional turns of the leader. The elastic spanning element is located in a circumferential groove in the edge of the base for its protection and for its lateral support during winding of the leader.

The elastic spanning element is preferably rectangular in cross section. It lays across the winding slots so that the leader in turn lays across the wide face of the elastic spanning element to reduce any kinking of the leader by increasing the contact area radius therebetween.

The base of the device is preferably constructed of a relatively rigid material to prevent distortion under the combined winding pressure of a number of leaders. Winding plan surfaces of the base extend between the winding slots. Lateral anchor slots in the winding plan surfaces of the base are provided which are oriented at an angle to the winding direction of the leader to provide variable anchor points for the hook typically found on leaders. The hook should be anchored first in the device, for safety. Elastic or soft anchor elements may be press fitted or glued into the lateral anchor slots to provide an improved hook holding ability. The elastic anchor elements may have ridges to make it easier to catch the point of the hook for insertion.

Elastic retaining elements running parallel to the winding direction of the leader extend between opposed pairs of winding slots and are located in the winding slots under the elastic spanning element. The elastic retaining elements provide a means of holding the free end of the leader after winding. The free end, which could be either a loop, a swivel, etc., would be placed under one of the elastic retaining elements which would hold it in place against the base. The winding plan surfaces of the base may be formed in a convex shape to increase the holding power of the elastic retaining elements when the end of the leader comes out over one of the winding plan surfaces of the base.

The foregoing is intended to be a brief summary of, and not a detailed catalogue of, some of the objects, features, advantages and characteristics of the present invention, since these and other objects, features, advantages and characteristics of the present invention will be directly or inherently disclosed by the following more detailed description of the present invention.

DESCRIPTION OF THE PREFERRED EMBODIMENTS

Figure 1:
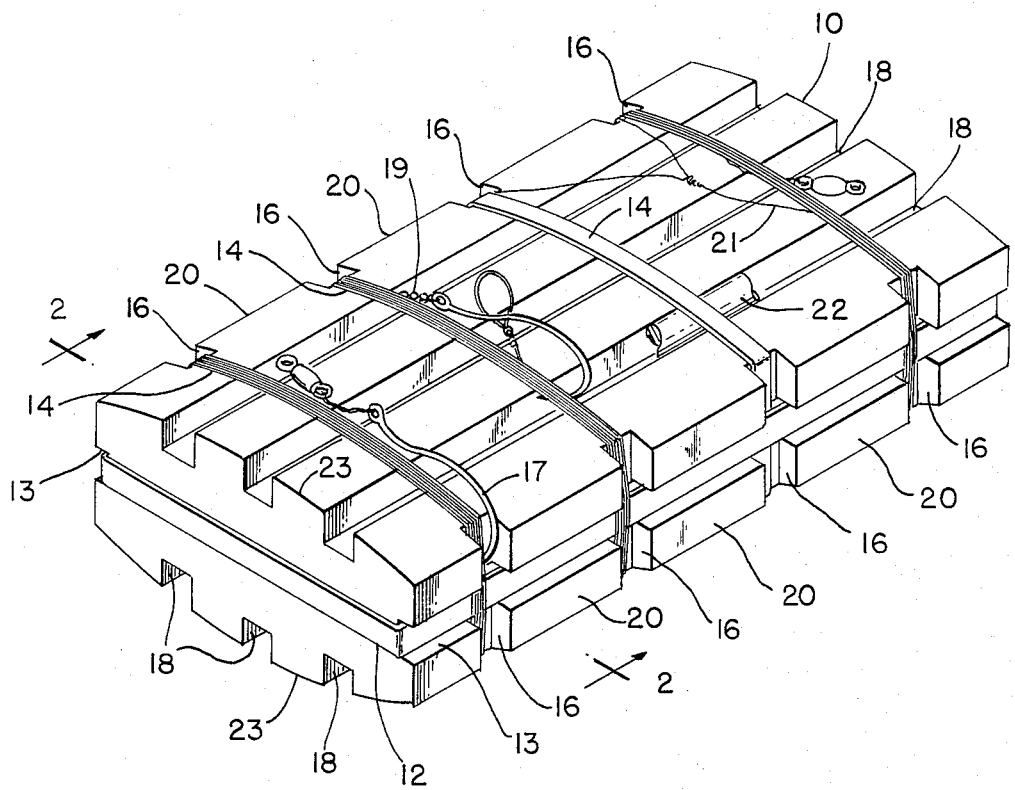
FIG. 1 is a perspective view of the invention having convex winding plan surfaces, and showing several optional leader attachment techniques.
Figure 2:
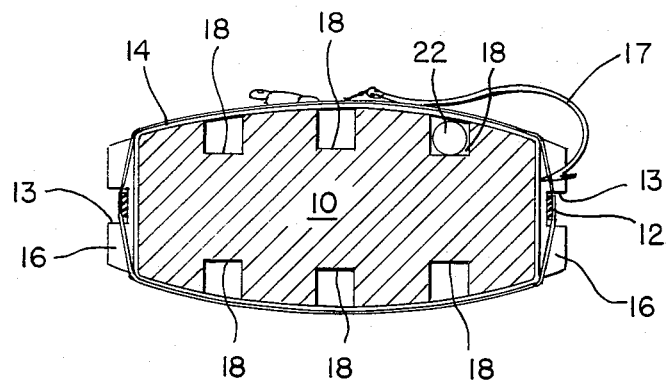
FIG. 2 is a cross-sectional view taken along line 2—2 of FIG. 1.

Referring to FIGS. 1 and 2, it is seen that the device comprises a base 10, an elastic spanning element 12 located in a groove 13 in the edges of the base 10, and elastic retaining elements 14 located in and extending between pairs of opposed winding slots 16. The base 10 is formed of any non-abrasive material to provide a winding mandrel.

In the embodiment shown in FIG. 1 there are several ways to attach an end of the leader 21, 19, 25 before starting the winding process. If the leader has a hook on one end, one way is to put the hook 15 on the base 10 as shown with the hook 15 in the slot 16. A second way, also shown in FIG. 1, is to anchor the hook 17 on the base 10 by putting the point of the hook 17 in a lateral anchor slot 18. This second method would be used if the free end of the leader 25 ended up in a slot 16 when the leader 25 was wound as described for hook 15. In either case, the hook 15, 17 should be anchored first before winding the leader 19, 25 for safety.

The lateral anchor slots 18 are formed in the base at an angle with respect to the winding direction of the leader 19, 21, 25 to provide variable anchor points for the hook 15, 17. As shown in FIG. 1, elastic or soft anchor inserts 22 can be placed in the lateral anchor slots 18 to provide a soft element into which to embed the point of a hook 15, 17.

If there is no hook, there are at least two options in anchoring the starting end of the leader 21, 19, 25 to the base. The first and preferred way, if there is a loop on one end of the leader 21, is to place the loop over a post 20 formed in the base 10 between two adjacent slots 16 on one side of the base 10 as shown in FIG. 1. The second way, if there is no loop on one end of the leader 21, is to place one end under an elastic element 14. This is accomplished by lifting an elastic element 14 off the base 10, placing a free end of the leader 21 under the elastic element 14, and releasing the elastic element 14 which will trap the free end of the leader 21 against the base 10.

Once the loop end or hook end of the leader 21, 19, 25 is anchored to the base 10 as has been described, the leader is then wound between an opposed pair of winding slots 16 over the elastic spanning element 12, and parallel to elastic retaining elements 14. As the leader is wound on the base 10, the elastic spanning element 12 deflects under the winding tension and maintains a tension on the leader to keep the leader tight on the base 10.

As shown in FIG. 2, the elastic spanning element 12 crosses the winding slots 16 above the bottom of the slots 16 to allow for downward defection of the elastic spanning element 12 during the winding process. This is accomplished by placing the elastic element 12 in the groove 13 which also protects the elastic spanning element 12.

When the winding of leader 21, 19, 25 is completed, its free end is secured under its respective elastic element 14. Removal of the leader is apparent from the foregoing.

The winding plan surfaces 23 of the base 10 against which the leader 21, 19, 25 is wrapped can be made convex as shown in FIGS. 1 and 2 in order to increase the downward force component of the tension force of the elastic retaining elements 14 on the leader.

The base 10 is formed with winding slots 16 to pilot and to protect the leader 21, 19, 25 which is shown in FIG. 1 wound parallel to the elastic elements 14 in opposing slots 16. The base 10 can be a four sided structure which can be rectangular in plan outline as shown in FIG. 1. A rectangular shape makes the distance between slots 16 constant and the user can then readily determine the approximate length of the leader 21, 19, 25 wound thereon by simply counting the turns and multiplying by two times the distance between slots 16 in which it is wound. The size and shape of the device 10, the number of slots 16 and elastic elements 14, and the number of slots 18 and elastic inserts 22 can be varied, with FIGS. 1-2 only showing these elements by way of non-limiting example.

The elastic spanning element 12 will be made as wide as allowed by the width of the groove 13 to increase the contact radius of element 12 with the leader 19, 21, 25 to minimize leader kinks after long term storage. All edges or sides of the base 10 over which a leader 19, 21, 25 will lay would, of course, also be chamfered to minimize any damage to the leader.

Referring now to the form of the device shown in FIG. 3, it is, aside from the differences discussed below, virtually identical to the device 10 shown in FIGS. 1 and 2, and has the same features and advantages. Accordingly, corresponding elements in FIG. 3 have been given the same reference numerals as those in FIG. 1, with a 3 prefix. No leaders are shown wound on the device of FIG. 3, for clarity.

Turning now to the differences, the base 310 is shown having the plan outline of a skewed parallelogram, with the opposed pairs of winding slots 316 being offset from each other. This shape of the base 310 and offsetting of the winding slots 316 permits more leader to be wound on the device, per turn of leader, since for a given width of the base 310 the pairs of offset opposing slots 316 are further apart than is the case for a rectangular base 10 in which the winding slots 316 are not offset. Thus, the device of FIG. 3 can be made more compact in width than the device of FIG. 1 and yet wind the same amount of leader for a given number of turns of the leader as compared to the device of FIG. 1.

Figure 3:
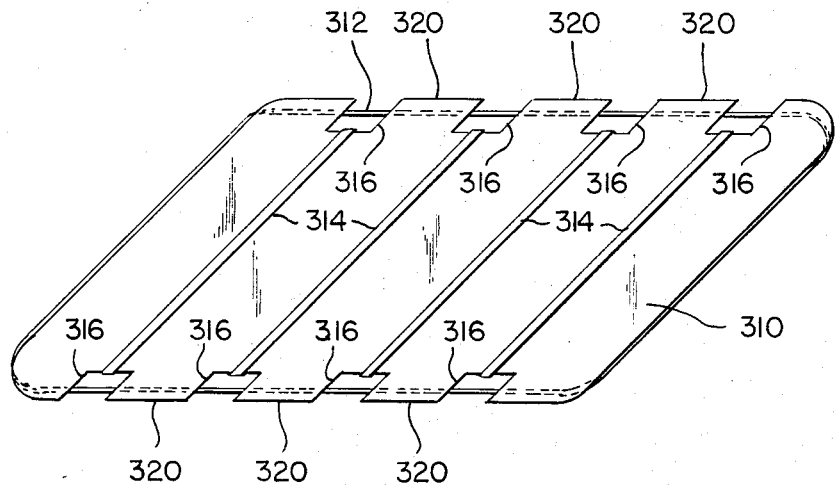
FIG. 3 is a top plan view of a second form of the invention having a base in the outline of a skewed parallelogram and having pairs of winding slots offset from each other.

Slots 18 and elements 22 are not shown in FIG. 3, for clarity, but corresponding elements 318 and 322 could be provided, if desired in FIG. 3.

Referring now to the form of the device shown in FIG. 4, it is, aside from the differences discussed below, virtually identical to the device 10 shown in FIGS. 1 and 2, and has the same features and advantages. Accordingly, corresponding elements in FIG. 4 have been given the same reference numerals as those in FIG. 1, with a 4 prefix. No leaders are shown wound on the device of FIG. 4 for clarity.

Turning now to the differences, the base 410 is shown having a plan outline which is tapered in width from one end of the device to the other. This embodiment provides the user a device which is best for winding and holding of both long and short leaders. The wide end of the base 410 would be used to wind long leaders without an unnecessary number of turns which would increase the time to put the leader on and to take the leader off the device. The narrow end of the base 410 would be used to wind shorter leaders where the increased number of turns is needed to multiply the slack takeup effect of the elastic spanning element 412.

Figure 4:
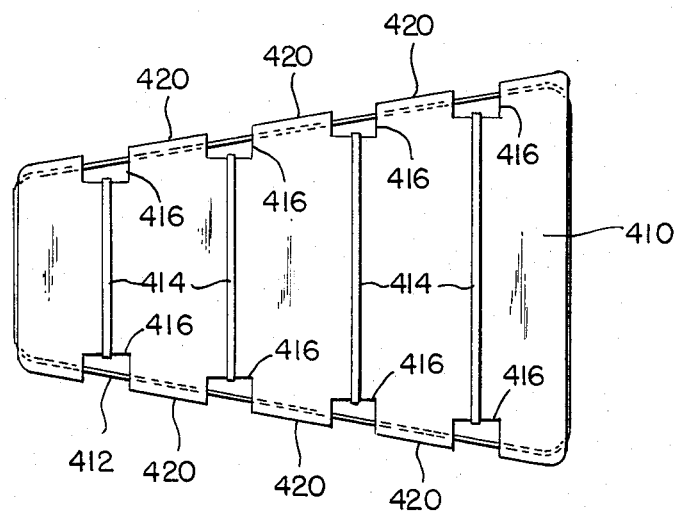
FIG. 4 is a top plan view of a third form of the invention having a base which tapers in width from one end to the other end.

Naturally, many other shapes of the device shown in FIG. 4 are possible which would also provide varying distances between opposing pairs of slots 416, such as by making the sides defining slots 416 convex, concave, etc.

No slots 18 or elements 22 are shown in FIG. 4, for clarity, but slots 418 and elements 422 could be provided if desired.

From the foregoing description it can be seen that the present invention provides a very simple and versatile leader storage device which accomodates a broad range of leader forms and lengths while allowing ease of winding and removal. It will be apparent that modifications can be made in the details of the described embodiments without departing from the teachings of the invention and hence the annexed claims are to be interpreted accordingly.

I claim:

1. A leader storage device comprising:
   a base;
   at least one pair of opposite winding slots located on opposite sides of said base, wherein said base includes a pair of posts located on opposite sides of each said winding slot, wherein each said winding slot has a bottom, and wherein said winding slots are adapted to have wound therein and therebetween leader means;
   at least one winding plan surface extending between said at least one pair of winding slots; and
   an elastic tension band, wherein said elastic tension band is supported by each said pair of posts, wherein said elastic tension band extends across said winding slots and is spaced away from said bottoms of said winding slots to permit said elastic tension band to be deflected downwardly under tension into said winding slots by said leader means, when said leader means is wound under tension over said elastic tension band, to permit said elastic tension band to exert a winding and holding tension on said leader means to keep said wound leader taut.

2. A leader storage device according to claim 1, wherein said base has a plan outline of at least generally a rectangle.

3. A leader storage device according to claim 1, wherein said winding slots comprising said at least one pair of opposite winding slots are offset from each other to provide, for a given width of said base, an increased distance therebetween as compared to when said winding slots comprising said pair of opposite winding slots are not offset from each other.

4. A leader storage device according to claim 3, wherein said base has a plan outline of at least generally a parallelogram which is skewed an amount at least generally equal to said offset.

5. A leader storage device according to claim 1, wherein said elastic tension band also extends across said winding slots below the tops thereof to allow said winding slots to provide both piloting of the winding of said leader means on said leader storage device and freedom for said downward deflection of said elastic tension band.

6. A leader storage device according to claim 1, wherein prior to said leader storage device having said leader means wound on it, said elastic tension band is rectangular in cross section, and has a pair of narrow edges and a pair of wide faces; wherein said elastic tension band is oriented across said winding slots with one of its said wide faces facing away from the bottoms of said winding slots to increase the contact radius between said elastic tension band and said leader means wound on said leader storage device so as to decrease the tendency of said leader means to kink.

7. A leader storage device according to claim 1, wherein said device further comprises a groove in at least one of said posts, wherein said elastic tension band lies in said groove, and wherein said groove provides lateral support and abrasion protection for said elastic tension band.

8. A leader storage device according to claim 1, further comprising at least one elastic retaining element means extending between said at least one pair of opposite winding slots, wherein said elastic retaining element means is adapted to secure an end of said leader means by said end of said leader means being inserted under said elastic retaining element means.

9. A leader storage device according to claim 6, wherein said at least one winding plan surface is convex in shape in a direction parallel to the longitudinal length of said elastic retaining element means.

10. A leader storage device according to claim 1, further comprising at least one hook anchor slot in said at least one winding plan surface, wherein said at least one hook anchor slot extends along a line which intersects at an angle a line extending between said at least one pair of opposite winding slots, wherein said hook anchor slot is adapted to anchor a hook on said leader means.

11. A leader storage device according to claim 10, further comprising a soft hook anchoring insert at least substantially filling said at least one anchor slot, wherein said soft hook anchoring insert is adapted to have a point of a hook on said leader means embedded therein to anchor said hook.

* * * * *